3,850,967
PURIFICATION OF BENZOPHENONE TETRACARBOXYLIC DIANHYDRIDE USING A SILICA CONTAINING ADSORBENT

Joseph C. Suatoni, New Kensington, Pa., assignor to Gulf Research & Development Company, Pittsburgh, Pa.
No Drawing. Filed Apr. 5, 1971, Ser. No. 131,430
Int. Cl. C07c 63/32
U.S. Cl. 260—346.3                                                13 Claims

---

ABSTRACT OF THE DISCLOSURE

Anhydrides, especially benzophenone tetracarboxylic dianhydride, are purified of acidic impurities by dissolving the impure anhydride in either acetone or a cyclic mono or diether, such as tetrahydrofuran or dioxane, and contacting the solution with a silica containing adsorbent.

---

This invention relates to the purification of anhydrides containing acidic impurities and more particularly to the purification of benzophenone tetracarboxylic dianhydride (BTDA) containing small amounts of acidic impurities.

U.S. Pat. No. 3,078,279, issued Feb. 19, 1963, to McCracken et al. relates to new anhydrides such as benzophenone tetracarboxylic dianhydride and describes a method for their preparation. U.S. Pat. No. 3,297,727, issued Jan. 10, 1967, also to McCracken et al., describes a method of purifying anhydrides such as a benzophenone 3,4,3',4'-tetracarboxylic dianhydride using certain defined ketones. Despite these purification procedures, small amounts of acidic impurities may still remain, i.e., on the order of five percent or less, and for certain purposes it may be desirable to remove these acidic impurities to obtain a product which assays 97, 98 or better weight percent anhydride. Such purity may be desired in the production of BTDA which is destined for use in the preparation of polyimides (see, for example, U.S. Pat. No. 3,356,691, issued Dec. 5, 1967 to Richard Gaertner). A method has now been discovered for the purification of anhydrides, such as BTDA, of acidic impurities so that anhydrides of 97 weight percent purity and better can easily be obtained.

In accordance with the invention, an acid anhydride can be purified of small amounts of acidic impurities by a process which comprises:

dissolving said admixture in a solvent selected from the group consisting of acetone and a cyclic mono or diether containing only carbon, hydrogen and etheric oxygen bonds and having from four to ten carbon atoms;

contacting said solution with a silica containing adsorbent; and recovering a purified acid anhiydride.

The process of this invention can be used to selectively remove acidic impurities or compounds from admixture with acid anhydrides. By "acid anhydrides" is meant organic acid anhydrides containing at least one

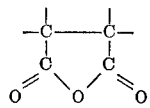

group, usually from one to four such acid anhydride groups. By "acid impurities" is meant an organic acid containing compound and particularly an acid containing compound which corresponds or is related structurally to the acid anhydride to be purified. Particularly suitable for purification by the method of this invention are those acid anhydrides wherein the carbonyl groups of the acid anhydride groups are directly connected to carbon atoms which are part of an aromatic ring. Preferred for treatment among the aromatic anhydrides are the aromatic dianhydrides containing from one to two aromatic rings. Especially preferred are the commercially available pyromellitic dianhydride (PMDA) and the benzophenone tetracarboxylic dianhydrides such as benzophenone 3,4,3',4'-tetracarboxylic dianhydride.

Examples of acidic impurities which may be associated with the preferred benzophenone tetracarboxylic dianhydrides and which can be removed in accordance with the method of this invention include benzophenone tetracarboxylic acids (BTA); trimellitic acid (TMA); trimellitic anhydride (TMAn); dimethylbenzophenone dicarboxylic acid; and methylbenzophenone tricarboxylic acid. These acidic impurities are present in amounts of up to five weight percent and some or all of these acidic impurities can be removed by the method of this invention, the amount of acidic impurities removed being a function of the purity of anhydride desired.

The acidic impurities can occur in the acid anhydrides either as impurities associated with the method of manufacture or may occur through partial hydrolysis of the acid anhydrides by improper handling or otherwise. Thus, the source of the admixture of impure acid anhydrides to be treated by the method of this invention is not critical.

The impure acid anhydrides are first dissolved in a solvent selected from the group consisting of acetone and cyclic mono or diethers having from four to ten carbon atoms. Examples of suitable cyclic monoethers are the furans, and in particular, tetrahydro-furan. The furans can be substituted by hydrocarbon groups such as alkyl groups so long as the total number of carbon atoms in the furan is from four to ten carbon atoms. Examples of furans which can be employed include, but are not limited to:

| | |
|---|---|
| tetrahydro-furan; | 2-methyl-tetrahydro-furan; |
| 2-methyl-furan; | 3-methyl-tetrahydro-furan; |
| 3-methyl-furan; | 2-ethyl-tetrahydro-furan; and |
| 2-ethyl-furan; | 3-ethyl-tetrahydro-furan. |
| 3-ethyl-furan; | |

A preferred cyclic diether is dioxane, and is particular, 1,4-dioxane and 1,3-dioxane. The hydrocarbon substituted dioxanes having four to ten carbon atoms can also be used and include as typical non-limiting examples:

(2,4-dimethyl)-1,3-dioxane;
(4-methyl)-1,3-dioxane; and
(2-methyl)-1,4-dioxane.

A sufficient amount of the solvent should be used so that the solution passes easily through a bed of the silica containing adsorbent. A suitable concentration range of acid anhydride in the solvent is from 0.1 to 4 weight percent, although this concentration range is not critical and is more usually from 1 to 2 weight percent. Heating of the solvent will aid in solubilizing the acid anhydrides. Temperatures from 25° to 50° C. are suitable.

The solvent should be as dry as feasible. Preferably the solvent is dried by the use of a suitable drying agent such as molecular sieves before use with the acid anhydrides of this invention. Drying is essential as moisture interferes with the proper operation of the silica adsorbent and will, of course, tend to react with the acid anhydrides to form the acidic impurities which it is the purpose of this invention to remove.

The solution of the impure acid anhydrides is thereafter contacted with a silica containing adsorbent which selectively adsorbs the acidic impurities. The contacting can occur by any suitable procedure such as by slurry contacting followed by filtration. Preferably, however, the solution is passed through a bed of a silica containing adsorbent where by the acidic impurities are adsorbed and the purified acid anhydrides are permitted to pass through. Usually the solution is passed downflow through a bed of the silica containing adsorbent at ambient temperatures and pressures.

The conditions of contacting are not critical and, as noted, ambient conditions are satisfactory and, of course, preferred for economic reasons. The conditions must be such that the solvent is maintained in the liquid phase. Thus higher pressures allow for the use of increased temperatures, but such increased temperatures and pressures are usually not economically justified. A suitable range of operating temperatures is from 15° to 50° C., preferably 20° to 30° C. Atmospheric pressure or pressures of five to ten p.s.i.g. to help the flow of solution through the adsorbent bed are usual, although higher pressures of up to 100 p.s.i.g. or more can be used.

The contact time is also not critical, and suitable contact times are from 5 to 60 minutes. In the preferred fixed bed operation, the liquid hourly space velocities of solution are suitably from 1 to 10 volumes of solution per volume of adsorbent per hour, with preferred LHSV's being from 3 to 5. The lower space velocities are preferred for those solutions containing the higher concentrations of impurities to allow sufficient time for proper adsorption.

The effluent from the adsorbent bed can properly be monitored by suitable analytical techniques to determine when the impurity level is sufficiently high to require regeneration of the adsorbent bed.

The adsorbent for use in the process of this invention is a silica containing adsorbent. Preferably the adsorbent is one of those high surface area glasses which are commercially available. Silica gel can also suitably be employed, but the glasses are preferred as they possess a higher surface area. Aluminas are for some reason not satisfactory for the purification process of this invention, although silica-aluminas are. The silica content should be a substantial portion of the adsorbent, amounts from 50 to 100 percent by weight of the adsorbent being satisfactory. Generally the surface area of the adsorbent should be at least 50 m.$^2$/gram to be reasonably effective. Preferably the surface area should be from 100 to 600 m.$^2$/gram, with the more usual surface areas being from 200 to 500 m.$^2$/gram. It is also important that the adsorbent be porous and that the average pore diameter be sufficiently large to admit the acidic impurities. Usually the average pore diameter is from 20 A. to 800 A., with the usual average pore diameter being from 30 A. to 80 A.

The mesh size of the adsorbent is not critical and can suitably be from 100/400, usually from 200/400. As noted above, water interferes with the adsorption and thus the adsorbent should first be dried by any suitable means. For example, silica gel may be dried at about 130° C. for about 16 hours at 0.5 atmosphere pressure.

For reasons which are not fully understood, the acidic impurities are selectively adsorbed on the silica containing adsorbent so long as the solvent employed is selected from the group defined above. The use of other solvents results in non-selective adsorption of both acid and acid anhydride components.

When the adsorbent bed is loaded with impurities as determined by any suitable technique, regeneration of the bed is appropriate to render it useful for further purification. The regeneration can occur in any suitable manner. Usually the adsorbed components are eluted by passage of a second fluid through the bed which is more strongly adsorbed than the acidic impurities. The usual regeneration fluid is water, or preferably a mixture of water and an organic polar solvent where the water content is at least 20 weight percent. The purpose of the polar organic solvent is to dissolve the organic acids once they are released from the adsorbent by the more strongly adsorbed water. Suitable regeneration fluids include a 50–50 mixture by weight of water and acetone or dioxane.

After elution of the impurities, the adsorbent must be dried by heating at temperatures greater than the vaporization temperatures of the regeneration fluids, usually over 100° C. for appropriate times.

The purified acid anhydrides can then be separated from the solvent by any suitable means such as fractional crystallization, vacuum drying techniques, etc., or the acid anhydrides can be sold in solution.

The invention will be further described with reference to the following experimental work.

EXAMPLE 1

An impure benzophenone-3,4,3',4'-tetracarboxylic acid dianhydride (BTDA) containing 1.0 percent BTA; 0.1 percent TMA; 0.5 percent di and tri acids; and 0.1 TMAn was purified by dissolving a sufficient amount of the impure BTDA in dioxane to produce a solution having a weight percent BTDA of 2. This solution was passed downflow through a bed of glass beads having a surface area of about 200 m.$^2$/gram; an average pore diameter of 75 A.; and a mesh size of about 200/400. The glass beads were substantially pure silica (CPG—10–75 A. glass beads sold by Corning Glass Works, Corning, N.Y.). The LHSV of the solution was 4 and a sufficient quantity was treated to give a glass to acidic impurity weight ratio of about 400:1.

Analysis of the product showed that over 95 weight percent of the acidic impurities were removed. Lesser amounts of impurities would obviously be removed if the ratio of glass beads to solution was reduced.

The adsorbed acid impurities were quantitatively eluted from the column using a 50–50 weight percent mixture of water and acetone.

The column was dried at 120–130° C. and was thereafter reused.

EXAMPLE 2

An impure BTDA containing 2.3 percent BTA, 0.32 percent TMA, and 0.73 percent di and tri acids was purified by dissolving a sufficient amount of the impure BTDA in tetrahydro-furan to produce a solution having a weight percent of BTDA of 2.0. This solution was passed downflow through a bed of silica gel having a surface area of about 340 m.$^2$/gram; an average pore diameter of 32 A.; and a mesh size of about 60/200. The silica gel was substantially pure silica (sold by the Davison Chemical Company, Baltimore, Md). The LHSV of the solution was 6, and a sufficient quantity was treated to give a silica gel to acidic impurity weight ratio of about 400:1.

Analysis of the product showed over 95 weight percent of the acidic impurities removed. The adsorbed acid impurities were quantitatively eluted from the column using a 60–40 weight percent mixture of water and 1,4-dioxane.

EXAMPLE 3

An impure BTDA containing 1.6 percent BTA, 0.17 percent TMA, 0.1 percent TMAn, and 0.64 percent di and tri acids was purified by dissolving a sufficient amount of the impure BTDA in tetrahydro-furan to produce a 1.9 weight percent solution of BTDA. This solution was passed through a column of glass beads having a surface area of about 100 m.$^2$/gram; an average pore diameter of 240 A.; and a mesh size of about 200/400. The glass beads were substantially pure silica (CPG—10–240 A. glass beads sold by Corning Glass Works). The LHSV of the solution was 4 and a sufficient quantity was treated to give a glass to acidic impurity weight ratio of about 500:1.

Analysis of the product showed that over 95 weight percent of the acidic impurities were removed. The adsorbed acid impurities were quantitatively eluted from the column using a 50–50 weight percent mixture of water and acetone.

I claim:

1. A method for the selective separation of organic acidic impurities from admixture with at least one benzophenone tetracarboxylic dianhydride which comprises:
   dissolving said admixture in a solvent selected from the group consisting of acetone and a cyclic mono or diether containing only carbon, hydrogen and etheric oxygen bonds and having from four to ten carbon atoms; and
   contacting said solution under conditions such that the solvent is maintained in the liquid phase with a porous silica containing adsorbent having from 50 to 100 weight percent silica; a surface area from 100 m.²/gram to 600 m.²/gram and an average pore diameter within the range of 20 A. to 800 A.

2. A method according to claim 1 wherein the solvent is acetone.

3. A method according to claim 1 wherein the solvent is tetrahydro-furan.

4. A method according to claim 1 wherein the solvent is dioxane.

5. A method according to claim 3 wherein the dianhydride is benzophenone-3,4,3',4'-tetracarboxylic dianhydride.

6. A method according to claim 1 wherein the adsorbent is glass beads.

7. A method according to claim 1 wherein the adsorbent is silica gel.

8. A method according to claim 1 wherein the adsorbent has a surface area from 200 to 500 m.²/gram and an average pore diameter from 30 A. to 80 A.

9. A method according to claim 8 wherein said solution is contacted with said silica containing adsorbent by passage of said solution through a bed of said adsorbent until acidic impurities above the level desired appear in the effluent.

10. A method according to claim 1 wherein the acidic impurities are aromatic acids.

11. A method according to claim 10 wherein the acidic impurities are selected from the group consisting of benzophenone tetracarboxylic acid; trimellitic acid; trimellitic anhydride; dimethylbenzophenone dicarboxylic acid; and methylbenzophenone tricarboxylic acid.

12. A method for the selective separation of organic acidic impurities from admixture with at least one benzophenone tetracarboxylic dianhydride which comprises:
    dissolving said admixture in a solvent selected from the group consisting of acetone and a cyclic mono or diether containing only carbon, hydrogen and etheric oxygen bonds and having from four to ten carbon atoms;
    passing said solution under conditions such that the solvent is maintained in the liquid phase through a bed of a porous silica containing adsorbent having from 50 to 100 weight percent silica; a surface area from 200 to 500 m.²/gram and an average pore diameter from 30 A. to 80 A. until acidic impurities above the level desired appear in the effluent;
    eluting the adsorbed components by passage through the bed of a mixture of water and a polar solvent where in said mixture the water content is at least 20 percent by weight;
    thereafter drying said bed at a temperature above 100° C.

13. A method according to claim 12 wherein the adsorbent is glass beads and the solvent is tetrahydro-furan.

References Cited

UNITED STATES PATENTS

| | | | |
|---|---|---|---|
| 3,544,602 | 12/1970 | Nohe et al. | 260—346.6 |
| 3,297,727 | 1/1967 | McCracken et al. | 260—346.4 |
| 3,592,827 | 7/1971 | Bergman | 260—346.3 |
| 1,693,915 | 12/1928 | Brode et al. | 260—708 |

FOREIGN PATENTS

| | | | |
|---|---|---|---|
| 11,133 | 4/1970 | Japan. | |
| 588,012 | 5/1947 | Great Britain | 260—708 |

OTHER REFERENCES

Iler: The Colloid Chemistry of Silica and Silicates, Ithaca Cornell Univ. Press, 1955, pp. 150–152, 251–4.

Gryazev et al.: Chem. Abstracts (1961), vol. 55, 6835e.

HENRY R. JILES, Primary Examiner

B. I. DENTZ, Assistant Examiner